US012125376B2

(12) United States Patent
Sugiura

(10) Patent No.: US 12,125,376 B2
(45) Date of Patent: Oct. 22, 2024

(54) INFORMATION PROCESSING DEVICE

(71) Applicant: DENSO CORPORATION, Kariya (JP)

(72) Inventor: Yasunobu Sugiura, Kariya (JP)

(73) Assignee: DENSO CORPORATION, Kariya (JP)

(*) Notice: Subject to any disclaimer, the term of this patent is extended or adjusted under 35 U.S.C. 154(b) by 802 days.

(21) Appl. No.: 16/867,136

(22) Filed: May 5, 2020

(65) Prior Publication Data

US 2020/0357272 A1    Nov. 12, 2020

(30) Foreign Application Priority Data

May 7, 2019  (JP) .................................. 2019-087810

(51) Int. Cl.
G08G 1/01 (2006.01)
G06V 20/52 (2022.01)
G08G 1/017 (2006.01)

(52) U.S. Cl.
CPC .......... G08G 1/0116 (2013.01); G06V 20/52 (2022.01); G08G 1/0133 (2013.01); G08G 1/017 (2013.01)

(58) Field of Classification Search
CPC .... G08G 1/0116; G08G 1/0133; G08G 1/017; G08G 1/096783; G08G 1/165; G08G 1/164; G08G 1/04; G06V 20/52; G06V 20/54; G06V 20/10
See application file for complete search history.

(56) References Cited

U.S. PATENT DOCUMENTS

| | | | |
|---|---|---|---|
| 2009/0262195 A1 | 10/2009 | Yoshida et al. | |
| 2009/0267801 A1* | 10/2009 | Kawai | G08G 1/096783 348/148 |
| 2017/0132922 A1* | 5/2017 | Gupta | G08G 1/0962 |
| 2018/0005528 A1* | 1/2018 | Loeillet | G08G 1/166 |
| 2019/0057600 A1 | 2/2019 | Watanabe et al. | |
| 2019/0057601 A1 | 2/2019 | Watanabe et al. | |
| 2019/0058849 A1 | 2/2019 | Watanabe et al. | |
| 2019/0156665 A1 | 5/2019 | Watanabe et al. | |
| 2021/0256848 A1* | 8/2021 | Miura | G08G 1/0125 |

FOREIGN PATENT DOCUMENTS

| | | |
|---|---|---|
| JP | 2002-117494 A | 4/2002 |
| JP | 2004-104274 A | 4/2004 |
| JP | 2005-045618 A | 2/2005 |
| JP | 2008-046744 A | 2/2008 |
| JP | 2008-059178 A | 3/2008 |

(Continued)

*Primary Examiner* — Aniss Chad
*Assistant Examiner* — Chase L Cooley
(74) *Attorney, Agent, or Firm* — MASCHOFF BRENNAN

(57) ABSTRACT

In an information processing device, a first acquisition part receives information regarding a first actual location of a vehicle on a road transmitted from the moving body. A second acquisition part receives an image transmitted from a camera. A memory stores information regarding a correspondence relationship between an image location on the image and a second actual location on a road corresponding to the image location. An identification part specifies a moving body image location on the image based on the first actual location and the information regarding the correspondence relationship. A display control part instructs a display device to display the image and information indicating the moving body image location together.

9 Claims, 11 Drawing Sheets

(56) References Cited

FOREIGN PATENT DOCUMENTS

| | | | |
|---|---|---|---|
| JP | 2010-218226 | A | 9/2010 |
| JP | 2010-245578 | A | 10/2010 |
| JP | 2011-034333 | A | 2/2011 |
| JP | 2011-154630 | A | 8/2011 |
| JP | 2014-089490 | A | 5/2014 |
| JP | 2017-167442 | A | 9/2017 |
| JP | 2018-037001 | A | 3/2018 |
| JP | 2018-169945 | A | 11/2018 |
| JP | 2018-170573 | A | 11/2018 |
| JP | 2019-008474 | A | 1/2019 |

* cited by examiner

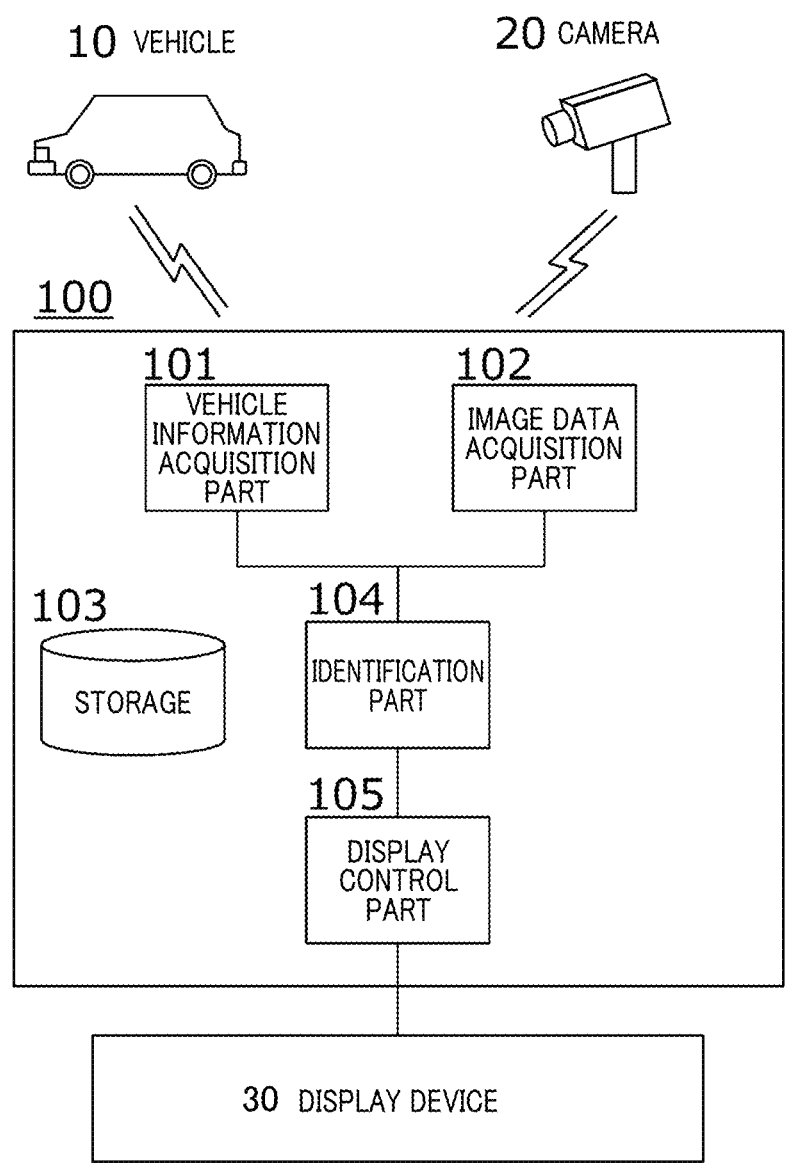

IMAGE

| Y \ X | 0 | 10 | ... | 120 | ... | 250 |
|---|---|---|---|---|---|---|
| 0 | N1,E1 | N3,E3 | | N10,E30 | | N50,E50 |
| 10 | N2,E2 | N5,E5 | | N11,E30 | | |
| ⋮ | | | | | | |
| 100 | N3,E1 | N10,E9 | | N30,E30 | | |
| ⋮ | | | | | | |
| 200 | | | | | | |

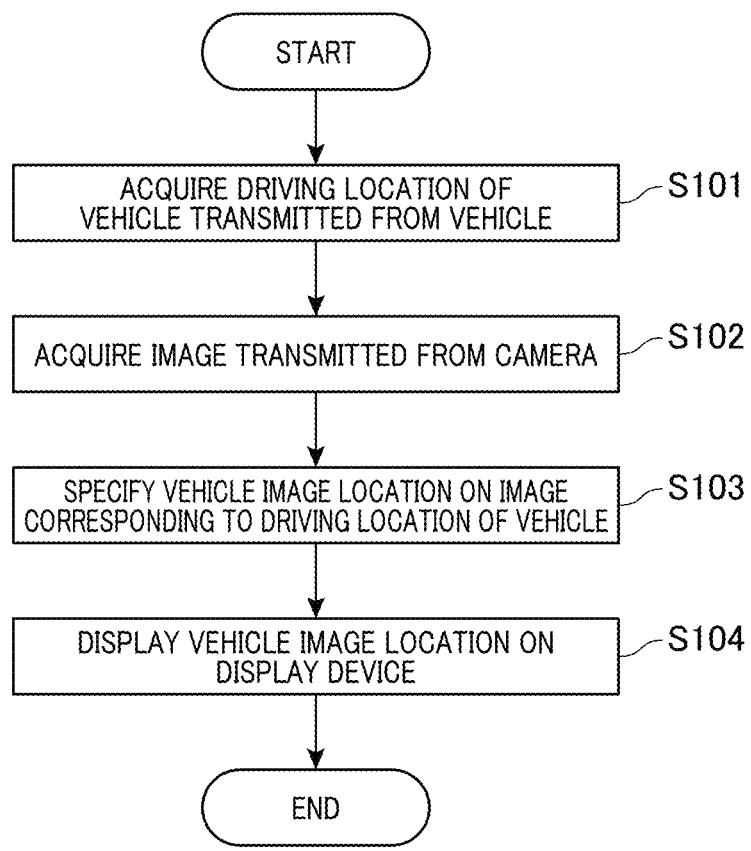

INFORMATION PROCESSING DEVICE

CROSS-REFERENCE TO RELATED APPLICATION

This application is related to and claims priority from Japanese Patent Application No. 2019-087810 filed on May 7, 2019, the contents of which are hereby incorporated by reference.

TECHNICAL FIELD

The present disclosure relates to information processing devices which perform visual remote monitoring control for an operator at a remote location to monitor moving bodies, obstacle, etc.

BACKGROUND

Recently, many monitoring cameras are installed everywhere in towns and cities. Because those monitoring cameras acquire and transmit large amount data of image, it is necessary for a monitoring system to receive large amount data of image and to perform image analysis to process received images with high accuracy and efficiency. For example, Patent document 1, Japanese patent laid open publication No. 2019-8474 discloses a monitoring control assist system for assisting an operator to perform the monitoring control of a road and moving bodies on the road so as to detect an abnormality of a moving body, the road and road facilities. The monitoring control assist system monitors those moving bodies, pedestrians, etc., and detects occurrence of an abnormality state of a stopped vehicle, a fallen object, a depression or hole in a road. The monitoring control assist system highlights the detected abnormality state displayed on a monitor device so as for an operator to correctly monitor the condition of the road with high efficiency.

There is a recent request for developing autonomous driving technology which provides self-driving vehicles or autonomous vehicles that perform autonomous driving control without driver's operation. Those self-driving vehicles perform automatic acceleration and deceleration, automatic steering and braking control. There is another recent request for providing autonomous vehicles without a driver thereof. Accordingly, it is preferred for the operator in a traffic operations center at a remote location to remotely monitor a driving state of self-driving vehicles for safety driving.

However, even if the result of visual inspection indicates that a vehicle is driving safety and no abnormality occurs in the vehicle, it is difficult for an image analysis technology to correctly detect an abnormal vehicle on the basis of images acquired by and transmitted from monitoring cameras. For the reason previously described, under the visual remote monitoring control, it is difficult for the operator of a traffic operations center to correctly detect a specific vehicle as a remote monitoring target on the acquired image, and to perform the remote monitoring and driving assist of the specified vehicle with high accuracy.

SUMMARY

It is desired to provide an information processing device having a computer system which includes a processor and a storage. The processor is configured to provide a first acquisition part, a second acquisition part, an identification part and a display control part. The first acquisition part receives and acquires information regarding a first actual location of a moving body on a road transmitted from the moving body. The second acquisition part receives and acquires an image acquired by and transmitted from an image acquisition device. The storage stores information regarding a correspondence relationship between an image location on the image and a second actual location on the road corresponding to the image location. The identification part specifies a moving body image location as a location of the moving body on the image on the basis of the first actual location of the moving body and the information regarding the correspondence relationship. The display control part instructs a display device to display the image and information indicating the moving body image location together.

BRIEF DESCRIPTION OF THE DRAWINGS

A preferred, non-limiting embodiment of the present disclosure will be described by way of example with reference to the accompanying drawings, in which:

FIG. 1 is a block diagram showing an information processing device according to a first exemplary embodiment of the present disclosure;

FIG. 4 is a view showing a flow chart explaining behavior of the information processing device according to the first exemplary embodiment;

DETAILED DESCRIPTION OF THE PREFERRED EMBODIMENTS

Figures 2A, 2B:
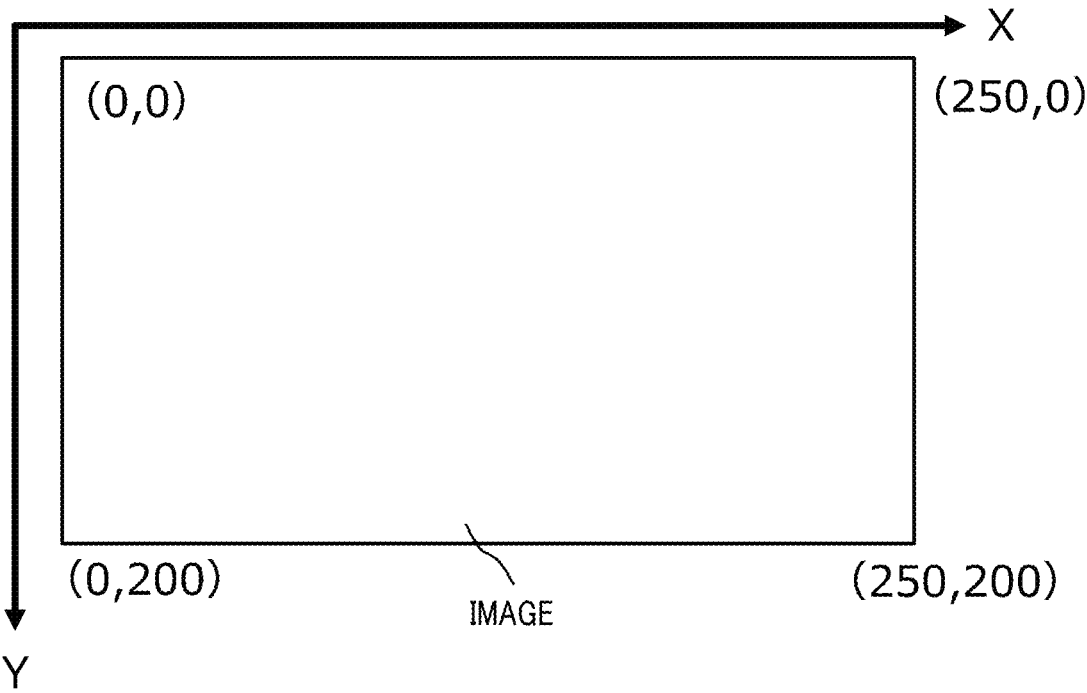
FIG. 2A is a view showing a schematic image on a X-Y coordinate system to be displayed on a display device shown in FIG. 1, in which the origin (0, 0) of the X-Y coordinate system is positioned at the upper left corner.
FIG. 2B is a view showing each target location corresponding to a coordinate (a longitude, a latitude) on the X-Y coordinate system assigned on the image shown in FIG. 2A.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of an information processing device 100 according to a first exemplary embodiment of the present disclosure with reference to FIG. 1 to FIG. 6.

FIG. 1 is a block diagram showing the information processing device 100 according to the first exemplary embodiment. As shown in FIG. 1, the information processing device 100 communicates with various types of devices, for example with moving bodies such as vehicles 10, one or more image acquisition devices such as cameras 20, and with a display device 30 through a wired communication network and a wireless communication network. In more detail, the information processing device 100 communicates with the vehicle 10 and the camera 20 through the wireless communication network. On the other hand, the information processing device 100 communicates with the display device 30 through the wired communication network.

The information processing device 100 and the display device 30 are installed at a traffic operations center, for example. The operator monitors the vehicle 10 as a remote monitoring target object on the image displayed on the display device 30 installed at the traffic operations center.

Hereinafter, the description will now be given of the information processing device 100 which performs a remote monitoring control so as to assist the remote monitoring operation of the vehicle 10. However, it is possible for the information processing device 100 to monitor moving bodies such as pedestrians, etc. in addition to vehicles.

The moving bodies represent various objects capable of moving at any moving speed. The moving bodies further represent stopped bodies on a road. Further, the moving bodies may also represent motor vehicles, trucks, motor cycles, bicycles, pedestrians, ships, boats, aircrafts, loaded cargos and containers therein, etc.

The vehicle 10 is equipped with a Global Positioning System (GPS). The vehicle 10 detects an own location detected by the GPS and transmits the information regarding the detected own location to the information processing device 100 through the wireless communication network. The vehicle 10 represents an autonomous vehicle (AV) or an manually-operated vehicle.

The camera 20 as an image acquisition device is a monitoring camera installed at an urban area and a shoulder of a road. The camera 20 transmits acquired image to the information processing device 100 through the wireless communication network.

The information processing device 100 receives original image data transmitted form the camera 10, and processes the received image data as needed, and transmits the original image data and the processed image data to the display device 30. The display device 30 receives those image data transmitted from the information processing device 100, and displays the received image data on a screen thereof.

(1) Structure of the Information Processing Device 100

A description will now be given of a structure of the information processing device 100 with reference to FIG. 1.

As shown in FIG. 1, the information processing device 100 is realized by using a computer system such as one or more central processing units and a storage 103 as a memory. The processor in the computer system provides a vehicle information acquisition part 101, an image data acquisition part 102, an identification part 104 and a display control part 105.

The vehicle information acquisition part 101 (which corresponds to a first acquisition part) receives information of a moving location of the vehicle 10 (which corresponds to a first actual location of the vehicle 10) transmitted from the vehicle 10. The moving location of the vehicle 10 is specified by using a longitude and latitude of the actual location of the vehicle 10.

The image data acquisition part 102 (which corresponds to a second acquisition part) sequentially receives image data, acquired in real time by, transmitted from the camera 20. The image data acquisition part 102 corresponds to a second acquisition part.

The storage 103 is composed of non-volatile memory devices such as a hard disk drive, a flash memory, etc.

The storage 103 stores a correspondence relationship between an image location on the image and an actual location on a road (as a second actual location) corresponding to the image location. The image location on the image has been acquired by the camera 20 and to be displayed on the display device 30. Hereinafter, the actual location on the road corresponding to the image location on the image is used as a target location, and the location on the image is referred to as an image location, in short.

For example, the target location can be represented by longitude and latitude. The correspondence relationship between the target location and the image location stored in the storage 103 will be explained later. For example, the location on the image includes a location of a remote monitoring target body on an image and a location of a remote monitoring target which is hidden by a building on the image.

The identification part 104 estimates, i.e. specifies, a vehicle image location of the vehicle 10 on the image, as an estimated vehicle image location which corresponds to a moving body image location by using the moving location of the vehicle 10 acquired by the vehicle information acquisition part 101 on the basis of the correspondence relationship between the target location and the image location stored in the storage 103. Hereinafter, the estimated vehicle image location is used as the moving body image location.

The identification part 104 determines the location on the image which corresponds to the moving location of the vehicle 10 on the basis of the correspondence relationship between the target location and the image location. It is possible to estimate that the vehicle 10 is displayed at a location on the image corresponding to the moving location of the vehicle 10. For this reason, the identification part 104 identifies that the location on the image corresponding to the moving location of the vehicle 10 indicates the vehicle image location, i.e. the estimated vehicle image location.

The display control part 105 instructs, i.e. transmits the image acquired by the image data acquisition part 102 to the display device 30 so as to display the image on a screen of the display device 30. The display control part 105 further instructs the display device 30 to display both the information regarding the vehicle image location and the image acquired by the image data acquisition part 102 together on the screen of the display device 30.

It is acceptable for the display control part 105 to simply transmit both the image and the information regarding the vehicle image location to the display device 30.

It is sufficient for the information processing device 100 to generate the information showing the vehicle image location so long as the operator can easily recognize and identify the presence of the target vehicle as a remote monitoring target. For example, it is possible for the information processing device 100 to use various types of markers having a different size such as lines, arrows, circles, squares, etc. to be displayed on the image so as to indicate the vehicle image location.

It is sufficient for the information processing device 100 to generate the information showing a position on the image based on the vehicle image location. For example, it is sufficient for the information processing device 100 to use those markers such as lines, arrows, circles, squares, etc. as previously described which is shifted by a predetermined distance from the vehicle image location identified by the identification part 104. This prevents the remote monitoring target vehicle and the marker from being displayed together on the image displayed on the display device 30. That is, this allows for the operator to correctly recognize the remote monitoring target vehicle and the marker which are displayed at a different position from each other on the image displayed on the display device 30.

(2) A Description Will Now be Given of the Correspondence Relationship Between the Target Location and the Image Location with Reference to FIG. 2A, FIG. 2B and FIG. 3. As previously explained, the target location represents the actual location on the road corresponding to the location on the image acquired by the camera 20. On the other hand, the image location represents the location on the image displayed on the display device 30.

FIG. 2A is a view showing a schematic image in a X-Y coordinate system to be displayed on the display device 30, in which the origin (0, 0) of the X-Y coordinate system is positioned at the upper left corner. The maximum X coordinate has 250, and the maximum Y coordinate is 200 in the X-Y coordinate system shown in FIG. 2A. The minimum unit in the X-Y coordinate system shown in FIG. 2A is one pixel, for example.

FIG. 2B is a view showing each target location corresponding to a coordinate (a longitude, a latitude) on the X-Y coordinate system assigned on the image shown in FIG. 2A. For example, the origin (0, 0) in the X-Y coordinate system on the image displayed on the display device 30 corresponds to the actual location represented by using the longitude and latitude (N1, E1). For example, the coordinate (250, 0) in the X-Y coordinate system corresponds to the actual location (N50, E50). FIG. 2B shows only a part of the target locations for brevity. Each of the overall coordinates in the X-Y coordinate system has a respective target location in the correspondence relationship stored in the storage 103.

It is possible to calculate in advance the longitude and latitude as the coordinate of each target location on the basis of various parameters such as a longitude, a latitude, a height and an incline of the camera 20a, a focal length, a distortion, etc. of the camera 20 as the installation location of the camera 20.

It is sufficient for the information processing device 100 according to the first exemplary embodiment to use any correspondence relationship between the target location of a moving body acquired by the camera 20 and the image location on the image thereof. Accordingly, it is possible for the information processing device 100 to use any method so long as it correctly obtains the target location.

For example, in a case when the vehicle information acquisition part 101 acquires the moving location (N30, E30) of the vehicle 10, the acquired moving location (N30, E30) corresponds to the image location (x=120, y=100), i.e. (120, 100) shown in FIG. 2B. On the basis of the relationship previously described, it is possible for the identification part 104 to specify the image location (120, 100) as the vehicle image location.

Figure 3:
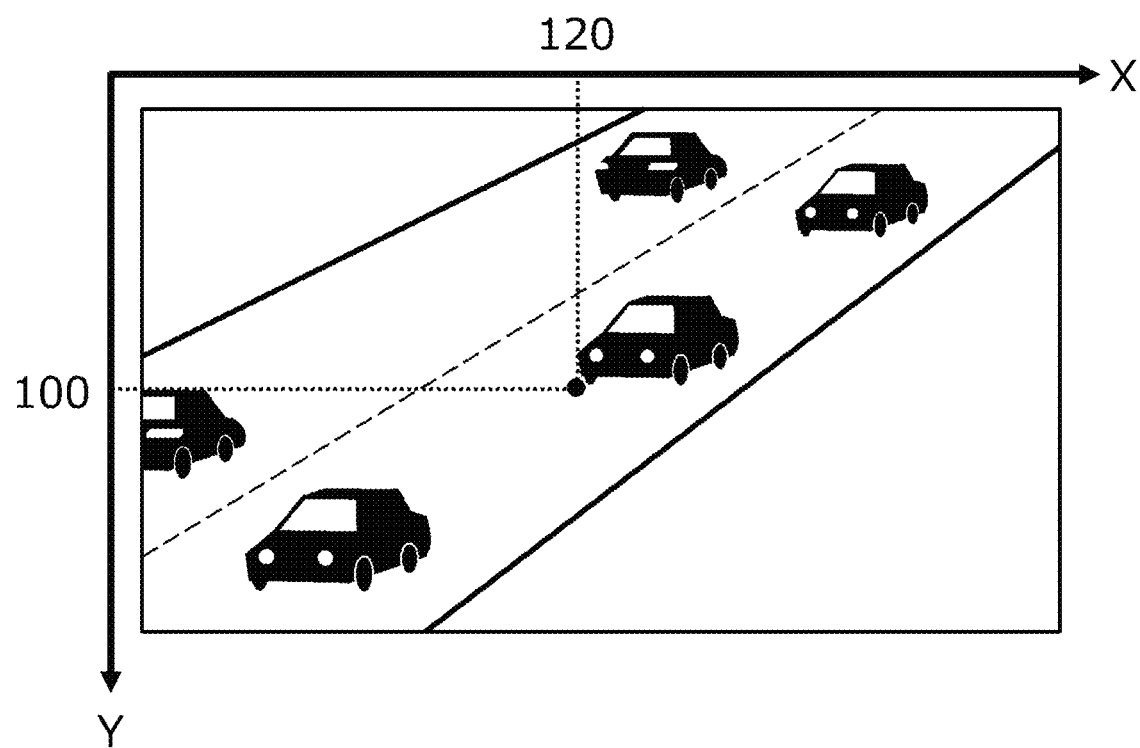
FIG. 3 is a view showing an example image to be displayed on a display device in the information processing device according to the first exemplary embodiment.

FIG. 3 is a view showing an example image to be displayed on the display device 30 in the information processing device 100 according to the first exemplary embodiment.

The center point on the image shown in FIG. 3 corresponds to the image location (120, 100), i.e. (x=120, y=100). It is possible to estimate that the vehicle 10 is present and displayed at this image location (129, 100) on the image shown in FIG. 3.

When no target location corresponding to the moving location (longitude, latitude) of the vehicle 10 is present in the correspondence relationship stored in the storage 103, it is acceptable for the identification part 104 to determine the target location nearest the moving location of the vehicle 10, and to specify the image location corresponding to the determined target location nearest the moving location of the vehicle 10. For example, when the moving location of the vehicle 10 is (N1.5, E1.5), it is possible for the identification part 104 to select and determine, as the vehicle image location, the image location (0, 10) corresponding to the target location (N2, E2) nearest the moving location of the vehicle 10.

It is acceptable for the identification part 104 to perform linear interpolation so as to specify the image location, which does not correspond to the target location, from a plurality of target locations close to the moving location of the vehicle 10.

For example, in a case in which the moving location of the vehicle 10 is (N1.5, E1.5), the identification part 104 specifies (0, 5) as a median of the image location (0, 0) corresponding to the target location (N1, E1) and the image location (0, 10) corresponding to the target location (N2, E2).

(3) A Description Will be Given of the Behavior of the Information Processing Device 100 According to the First Exemplary Embodiment with Reference to FIG. 4.

Before performing a series of processing shown in FIG. 4, the storage 103 has stored the information regarding the correspondence relationship between the target location and the image location, which has been previously explained at (2).

FIG. 4 is a view showing a flow chart explaining the behavior of the information processing device 100 according to the first exemplary embodiment.

In step S101 shown in FIG. 4, the vehicle information acquisition part 101 in the information processing device 100 receives the moving location of the vehicle 10 as the actual location of the vehicle 10 on a road transmitted from the vehicle 10. The operation flow progresses to step S102.

In step S102, the image data acquisition part 102 receives the image acquired by the camera 20. The operation flow progresses to step S103.

In step S103, the identification part 104 specifies the vehicle image location as the location of the vehicle 10 on the image which corresponds to the moving location of the vehicle 10 acquired at S101 on the basis of the correspondence relationship between the target location and the image location which has been stored in the storage 103. The operation flow progresses to step S104.

In step S104, the display control part 105 instructs the display device 30 to display the information regarding the vehicle image location on the image acquired at S102.

The vehicle information acquisition part 101 continuously receives the information regarding the moving location of the vehicle 10 transmitted at predetermined intervals from the vehicle 10. The information processing device 100 repeatedly performs the series of processing shown in FIG. 4 every when receiving the latest moving location of the vehicle 10. This makes it possible to update the information representing the vehicle image location displayed on the display device 30. The information processing device 100 according to the first exemplary embodiment, i.e. specifically the display control part 105, instructs the display device 30 to display the vehicle image location with high accuracy even if the location of the vehicle 10 on the image, i.e. the vehicle image location on the image is moving associated with the moving of the vehicle 10 on a road.

Figure 5A:
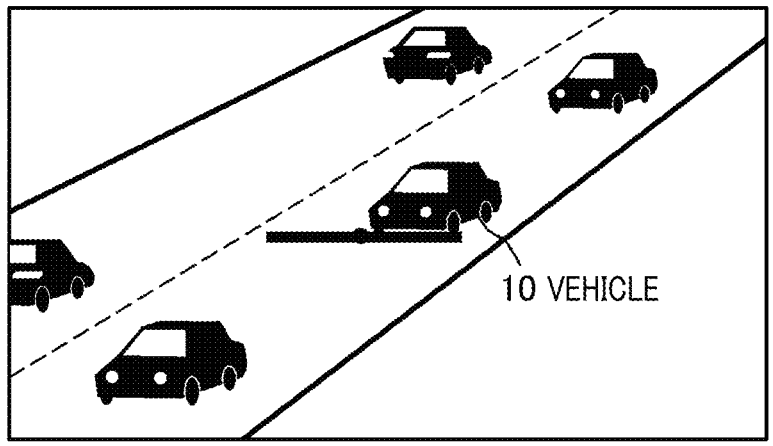
FIG. 5A, FIG. 5B and FIG. 5C are views showing example images to be displayed on the display device controlled by the information processing device according to the first exemplary embodiment.
Figure 5B:
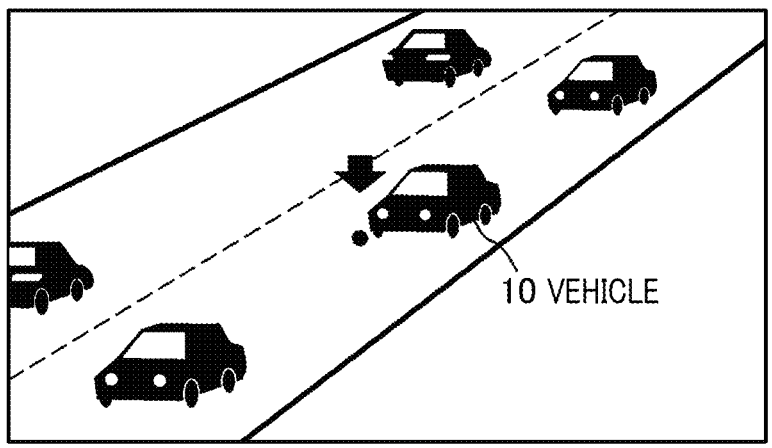
Figure 5C:
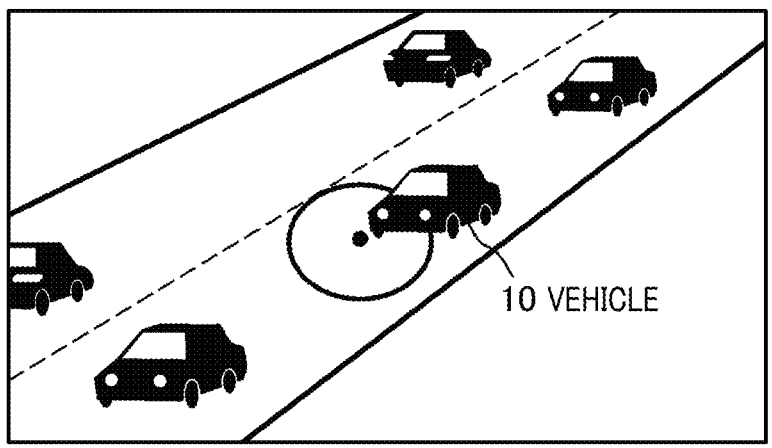

FIG. 5A, FIG. 5B and FIG. 5C are views showing example images to be displayed on the display device 30 instructed and controlled by the information processing device 100 according to the first exemplary embodiment. In particular, FIG. 5A shows an example image with a line mark (e.g. a black-color line mark) at the center thereof displayed on the display device 30 as the information representing the vehicle image location. The line mark shown in FIG. 5A passes through the vehicle image location. It is acceptable for the information processing device 100 to use various types and color of line marks.

On the other hand, FIG. 5B shows an example image with an arrow mark (e.g. a black-color arrow mark) which represents the vehicle image location. FIG. 5C shows an example image with a circle mark around the vehicle image location. This makes it possible for the operator who is monitoring vehicles on the image displayed on the display device 30 to correctly recognize the vehicle 10 (as the remote monitoring target vehicle to be monitored) on the basis of the arrow mark closet to the vehicle image location.

Figure 6:
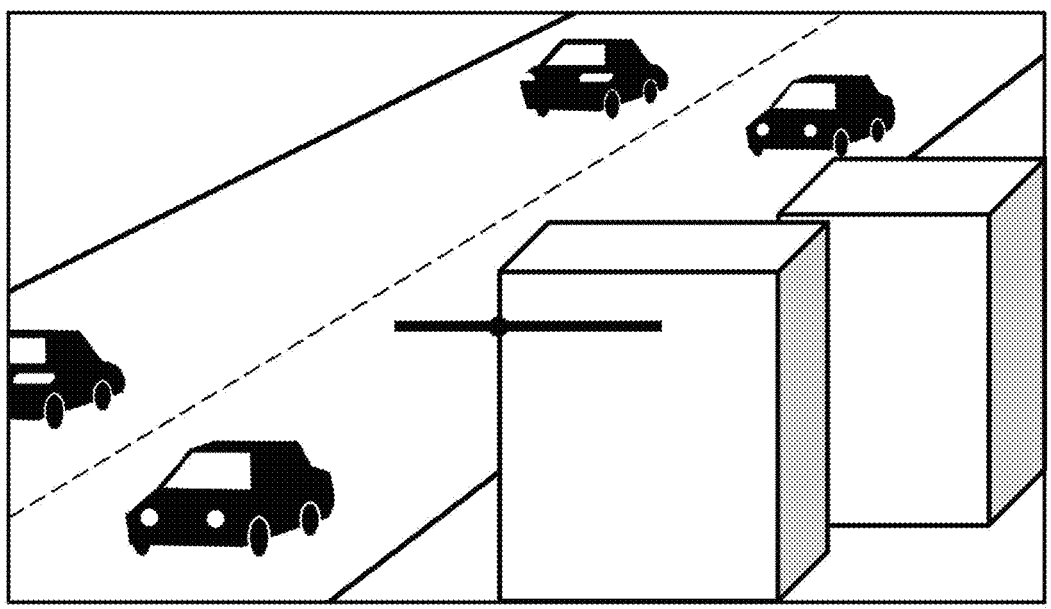
FIG. 6 is a view showing another example image to be displayed on the display device controlled by the information processing device according to the first exemplary embodiment.

FIG. 6 is a view showing another example image to be displayed on the display device 30 controlled by the information processing device 100 according to the first exemplary embodiment.

As shown in FIG. 6, the vehicle as the remote monitoring target body and a part of the road are hidden by the two buildings located between the vehicle 10 (not shown) and the camera 20 (not shown).

In the information processing device 100 according to the first exemplary embodiment, because the identification part 104 estimates the vehicle image location on the image on the basis of the moving location of the vehicle 10 transmitted from the vehicle 10, it is possible to correctly specify the vehicle image location of the vehicle 10 on the image even if the vehicle 10 is hidden by the building and it is difficult to display the location of the vehicle 10 on the display device 30.

The information processing device 100 according to the first exemplary embodiment previously described does not use and perform any image analysis process. However, the concept of the present invention is not limited by the disclosure of the first exemplary embodiment. It is possible for the information processing device 100 to be equipped with an image analysis part (not shown) performing an image analysis processing so as to assist the operator's monitoring operation of the remote monitoring target vehicle.

As shown in FIG. 4, after the completion of performing the series of the processes shown in FIG. 4 so as to specify the vehicle image location, it is acceptable for the information processing device 100 to determine the target vehicle, the location of which is closest to the specified vehicle image location, to be monitored on the image displayed on the display device 30. In this case, the display control part 105 instructs the display device 30 to display the information regarding the target vehicle and to trace a driving locus of the remote monitoring target vehicle by using an image analysis method. When instructing the display device 30 to display a line mark representing the information regarding the vehicle image location on the image, it is possible for the display control part 105 to detect a road width by using the image analysis technology, and to instruct the display device 30 to display the line mark having the same length of the detected road width on the image.

As previously described in detail, it is possible for the information processing device 100 to correctly specify the location of the remote monitoring target vehicle on the image on the basis of the correspondence relationship between the target location and the image location, where the target location represents the actual location on the road corresponding to the location on the image, and the image location represents the location on the image).

This makes it possible for the operator to easily monitor the remote monitoring target vehicle, etc. on the image displayed on the display device 30.

Second Exemplary Embodiment

A description will be given of the information processing device 100 according to a second exemplary embodiment of the present disclosure with reference to FIG. 7A and FIG. 7B.

Figure 7A:
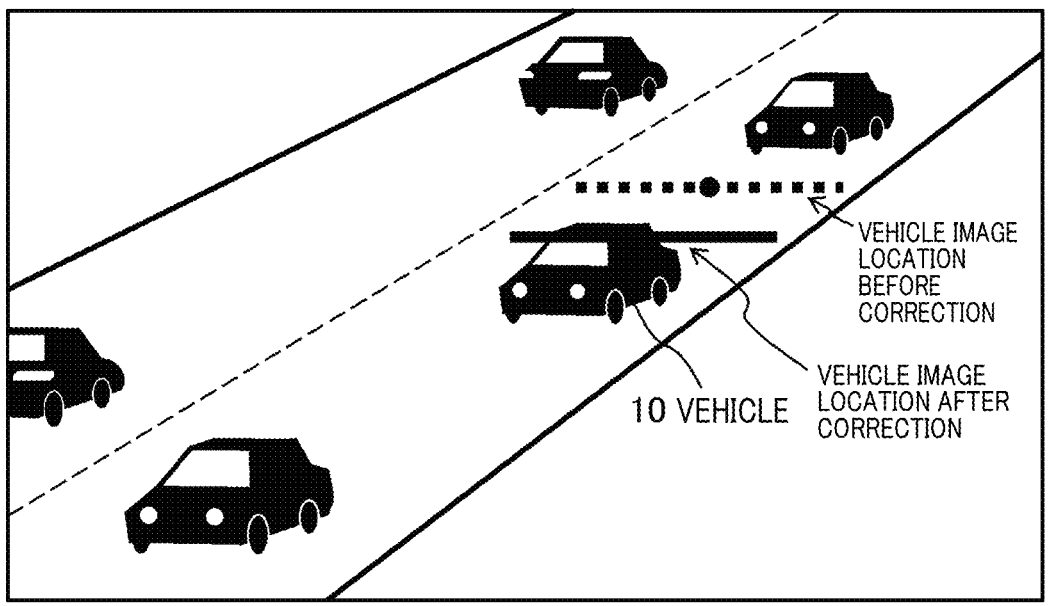
FIG. 7A and FIG. 7B are views showing example images to be displayed on the display device controlled by the information processing device according to a second exemplary embodiment of the present disclosure.
Figure 7B:
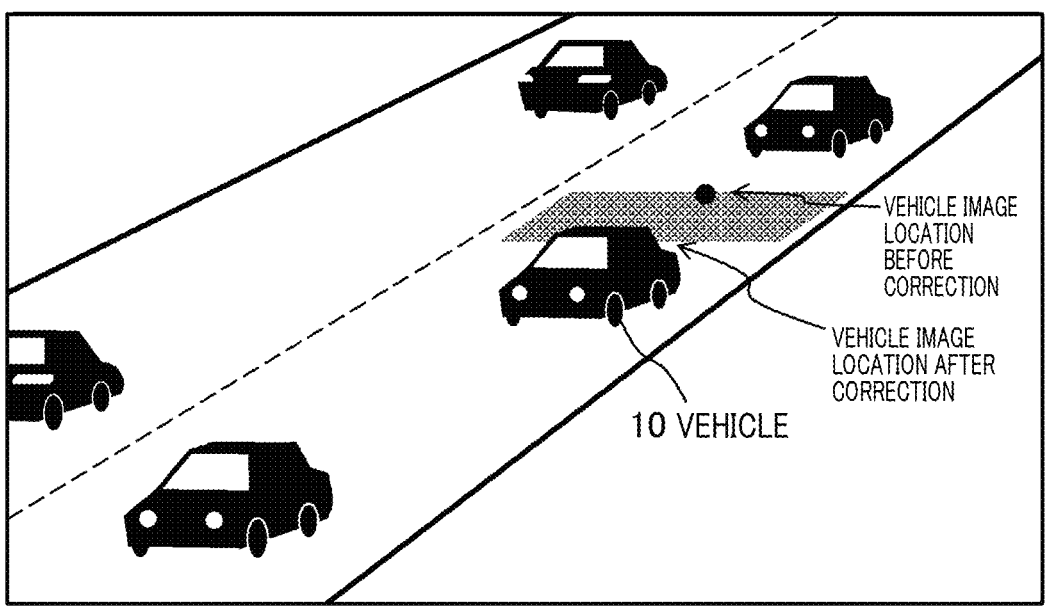

FIG. 7A and FIG. 7B are views showing example images to be displayed on the display device 30 controlled by the information processing device 100 according to the second exemplary embodiment.

As previously described, the first exemplary embodiment has explained the structure of the information processing device 100 which specifies, as the vehicle image location, the location on the image corresponding to the moving location of the vehicle 10.

On the other hand, the second exemplary embodiment will disclose a method which is referred to a computer implemented method, to be performed by the image processing device 100 which specifies the location of the remote monitoring target vehicle 10 on the image with high accuracy while compared with the method performed by the first exemplary embodiment.

In addition to the information regarding to the moving location of the vehicle 10 previously described in the explanation of the first exemplary embodiment, the vehicle information acquisition part 101 receives information regarding a moving time and a moving speed of the vehicle 10, where the moving time represents the time when the GPS mounted on the vehicle 10 receives the moving location of the vehicle 10 itself, and the moving speed of the vehicle 10 is detected by a speed sensor mounted on the vehicle 10.

The time when the GPS mounted on the vehicle 10 acquires the moving location of the vehicle 10 corresponds to a first time.

The image data acquisition part 102 receives information regarding a capturing time (which corresponds to a second time) when the camera 20 acquires the image in addition to the information regarding the image transmitted from the camera 20.

The information processing device 100 according to the second exemplary embodiment receives the first time and the second time synchronized from each other through a network time protocol (NTP).

As previously explained in the first exemplary embodiment, the vehicle information acquisition part 101 and the image data acquisition part 102 receive various information regarding the moving location of the vehicle 10 and the image acquired by the camera 20 through a wireless communication network. For this reason, a time delay may occur due to a congestion in the NTP. That is, a possible time delay will occur, where a receiving time when the vehicle information acquisition part 101 receives the information regarding the first time is delayed from the first time when the GPS mounted on the vehicle 10 acquires the moving location of the vehicle 10, or a receiving time when the image data acquisition part 102 receives the information regarding the second time is delayed from the second time when the camera 20 acquires the image.

As a result, this time delay causes a timing difference between the first time when the GPS mounted on the vehicle 10 acquires the moving location of the vehicle 10 and the second time when the camera 20 acquires the image. This time delay will cause a possible error in which the location of the vehicle 10 on the image is shifted from the correct location of the vehicle 10 on the image. In order to avoid this drawback, and to correct the timing difference, the information processing device 100 according to the second exemplary embodiment adjusts and corrects the timing difference between the first time and the second time, where the first time represents the time when the GPS mounted on the vehicle 10 acquires the moving location of the vehicle 10 and the second time represents the time when the camera 20 acquires the image.

In the information processing device 100 according to the second exemplary embodiment, the identification part 104 specifies the image location, as the moving body image location, which corresponds to the moving location of the vehicle 10 acquired by the vehicle information acquisition part 101 based on the correspondence relationship between the target location and the image location. This correspondence relationship between the target location and the image location has been previously explained in the first exemplary embodiment.

Similar to the first exemplary embodiment, the information processing device 100 according to the second exemplary embodiment specifies the moving body image location as the image location, which will be used as the moving body image location before correction. The second exemplary embodiment corrects this moving body image location before correction so as to obtain the moving body image location after correction with high accuracy.

That is, the identification part 104 calculates a movement distance of the vehicle 10 during the time period measured from the moving time as first time when the GPS mounted on the vehicle 10 acquires the moving location of the vehicle 10 to the capturing time as the second time when the camera 20 acquires the image on the basis of a time difference between the first time and the second time, and the moving speed of the vehicle 10 obtained by the vehicle information acquisition part 101.

Because the calculated movement distance of the vehicle 10 is an actual movement distance of the vehicle, the identification part 104 converts the calculated movement distance of the vehicle 10 to an image distance on the image. It is acceptable for the identification part 104 to use another computer implemented method capable of converting the calculated movement distance to the image distance displayed on the image.

For example, it is acceptable for the storage 103 to store in advance information representing a correspondence relationship between the image distance between X and Y coordinates on the image and an actual distance between the target locations corresponding to these X and Y coordinates.

Further, the identification part 104 specifies a moving direction of the vehicle 10 to which the vehicle 10 has moved during the time period measured from the moving time as the first time when the GPS mounted on the vehicle 10 has acquired the moving location of the vehicle 10 to the second time when the camera 20 has acquired the image. For example, it is possible for the identification part 104 to specify the moving direction of the vehicle 10 on the basis of the information regarding the moving direction of the vehicle 10 transmitted from the vehicle 10 and acquired by the vehicle information acquisition part 101.

The example previously described has been processed on an assumption that the first time when the GPS mounted on the vehicle 10 acquires the moving location of the vehicle 10 is delayed from the second time when the camera 20 acquires the image. On the other hand, the second time when the camera 20 acquires the image may be delayed from the first time when the GPS mounted on the vehicle 10 acquires the moving location of the vehicle 10.

The identification part 104 further specifies the vehicle image location to which the vehicle 10 has moved on the image in the moving direction of the vehicle 10 from the moving body image location before correction, corresponding to the calculated actual moving direction of the vehicle 10 on the road.

Because it is assumed that the vehicle 10 is displayed on the image at the specified moving body image location moved from the moving body image location before correction, it is possible for the identification part 104 to determine this specified moving body image location as the vehicle image location of the vehicle 10 on the image.

It is possible for the identification part 104 to use a predetermined direction instead of using the information regarding the moving direction of the vehicle 10 transmitted from the vehicle 10 and acquired by the vehicle information acquisition part 101.

For example, the identification part 104 specifies a moving body image location shifted in a predetermined moving direction on the road on the basis of the moving body image location before correction. It is possible for the identification part 104 to perform the image processing analysis to recognize this predetermined moving direction. It is sufficient to use, as the predetermined moving direction, a possible direction toward which the vehicle can move within a predetermined distance. For example, it is sufficient to use the predetermined moving direction of the vehicle which indicates the forward direction of the vehicle on the road. Further, it is acceptable to use, as the predetermined moving direction, a forward direction or a backward direction on the road.

It is possible for the information processing device 100 according to the first exemplary embodiment to have a structure in which the display control part 105 instructs the display device 30 to display, in addition to information regarding the estimated vehicle image location, information regarding the moving body image location before correction which has been obtained when the vehicle image location is specified. That is, the estimated vehicle image location may be shifted from the location of the vehicle on the image due to a rapid change of a moving speed of the vehicle after the location of the vehicle 10 on the image has been corrected by using the method, i.e. the computer implemented method previously described.

In order to avoid this drawback, it is possible for the operator to correctly recognize the possible occurrence previously described by displaying the vehicle image location as the moving body image location and the moving body image location before correction on the image simultaneously. For example, it is sufficient to simply display the estimated vehicle image location and the location of the vehicle on the image displayed on the display device 30 so long as the operator clearly and correctly recognizes them on the image. For example, it is acceptable to use a single marker representing them at the same location on the image so long as the operator clearly and correctly recognizes them on the image.

FIG. 7A and FIG. 7B show two display examples of the image displayed on the display device 30. In particular, FIG. 7A shows a display example to use two markers which represent the vehicle image location (as the moving body image location) before correction and after correction. On the other hand, FIG. 7B shows another display example to use a single marker with a color graduation by which the vehicle image location before correction is clearly different in color from the vehicle image location after correction.

When the display device 30 displays the information regarding the vehicle image location (as the moving body image location) before correction in the examples shown in FIG. 7A and FIG. 7B, it is difficult for the operator to correctly recognize whether the remote monitoring target is the vehicle 10 or another vehicle behind.

On the other hand, as shown in FIG. 7A, the information processing device 100 according to the second exemplary embodiment corrects the location of the vehicle 10 on the image and displays the corrected location on the image. This makes it possible for the operator to correctly recognize the vehicle 10 on the image.

Further, as shown in FIG. 7B, the information processing device 100 according to the second exemplary embodiment instructs the display device 30 to display the marker representing the position at which the vehicle 10 is present before and after the correction. This makes it possible for the operator to correctly recognize the vehicle 10 on the image because the display device 30 displays the possible range on the image in which the vehicle 10 is present even if the estimated vehicle image location is shifted from the location of the vehicle 10 on the image.

As previously described, the information processing device 100 according to the second exemplary embodiment specifies the location of the vehicle 10 on the image with high accuracy, and this makes it possible for the operator to monitor the remote monitoring target object without error.

Modification

A description will now be given of a modification of the second exemplary embodiment. The modification uses another method of correcting the vehicle image location (i.e. the moving body image location) which is the remote monitoring target on the image, i.e. corrects the location of the vehicle 10 on the image.

Similar to the vehicle information acquisition part 101 and the image data acquisition part 102 in the information processing device 100 according to the second exemplary embodiment, the vehicle information acquisition part 101 and the image data acquisition part 102 according to the modification obtains the information regarding the moving time (as the first time) and the moving speed of the vehicle 10, and the capturing time as the second time.

The identification part 104 calculates the movement distance of the vehicle 10 during the time period measured from the moving time as first time when the GPS mounted on the vehicle 10 acquires the moving location of the vehicle 10 to the capturing time as the second time when the camera 20 acquires the image on the basis of the time difference between the first time and the second time.

Further, the identification part 104 calculates the location of the vehicle 10 measured from the moving location of the vehicle 10 obtained by the vehicle information acquisition part 101 on the basis of the calculated movement distance in the moving direction of the vehicle 10. This calculated location of the vehicle 10 corresponds to the actual location of the vehicle 10 on the road (as a third actual location) at the capturing time of the camera 20.

The identification part 104 specifies the vehicle image location (as the moving body image location), i.e. the location of the vehicle 10 on the image which corresponds to the actual location of the vehicle 10 on the road at the capturing time of the camera 20 on the basis of the correspondence relationship between the target location and the image location stored in the storage 103.

Because it is possible to estimate that this specified vehicle image location corresponds to the vehicle 10 on the image, the identification part 104 determines this specified vehicle image location as the vehicle image location of the vehicle 10 on the image.

The identification part 104 according to the modification of the second exemplary embodiment does not specify the vehicle image location before correction. Accordingly, the display control part 105 instructs the display device 30 to display the information regarding the vehicle image location of the vehicle 10 as the vehicle image location after correction only.

Third Exemplary Embodiment

A description will be given of the information processing device 100 according to a third exemplary embodiment of the present disclosure with reference to FIG. 8.

The first and second exemplary embodiments previously described may have a case in which the display device 30 displays an image having an area where no vehicle may be moving. It is not necessary for the display device 30 to display the image having such area. This often causes a possible incorrect monitoring where the operator may lose a remote monitoring target body due to the presence of such area.

In order to avoid this possible incorrect monitoring, the third exemplary embodiment provides the information processing device 100 having a structure capable of adjusting a degree of resolution and/or brilliant of an image or a part of the image.

In the structure of the information processing device 100 according to the third exemplary embodiment, the display control part 105 adjusts the resolution and/or brightness of a specific area in the image to be displayed on the display device 30. That is, the display control part 105 instructs the display device 30 to display the image including the specific area with the adjusted resolution and brightness.

In general, an image acquired by the camera 20 as the image acquisition device includes a first area and a second area. The first area includes roads on which vehicles are moving. On the other hand, the second area includes rivers, mountains, sky, buildings where unlikely that vehicles will be driving.

The display control part 105 adjusts the image acquired by the camera 20 so that the first area in the image has the resolution and brightness which are higher than the resolution and brightness of the second area. For example, the display control part 105 determines the area corresponding to the second area on the image, and reduces the resolution and brightness of the determined area as the second area. It is acceptable for the display control part 105 to determine the area corresponding to the first area on the image, and increases the resolution and brightness of the determined area as the first area.

It is acceptable for the information processing device 100 to select any method of adjusting the resolution and brightness of the determined area on the acquired image to be displayed on the display device 30. For example, it is possible for the identification part 104 to determine the area on the basis of the correspondence relationship between the target location and the image location stored in the storage 103, and to adjust the brightness of the determined area. The correspondence relationship has been explained in the first exemplary embodiment. Specifically, the information processing device 100 receives position information such as a longitude and a latitude thereof, where it is difficult for a vehicle to drive, transmitted from a map database (not shown). The identification part 104 specifies the location regarding the received position information on the image on the basis of the correspondence relationship between the target location and the image location. The identification part 104 determines the specified area on the image and reduces the resolution and brightness of the area including the specified location.

It is acceptable for the information processing device 100 to perform the image analysis function so as to automatically determine an area, where vehicles are unlikely to be present, on the acquired image, and to reduce the resolution or brightness of the determined area on the image. It is acceptable for the operator to manually select and determine this area on the image.

Figure 8:
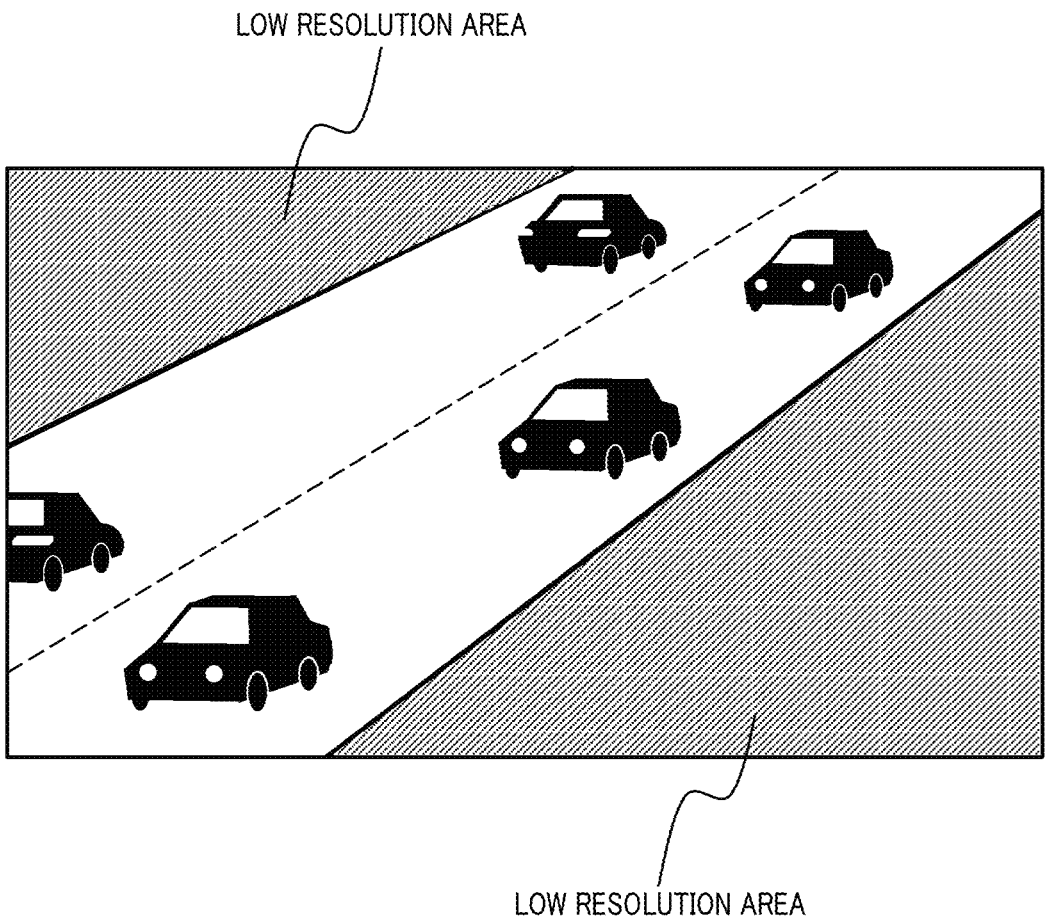
FIG. 8 is a view showing an example image displayed on the display device under the control of the information processing device according to a third exemplary embodiment of the present disclosure.

FIG. 8 is a view showing an example image displayed on the display device 30 under the control of the information processing device 100 according to the third exemplary embodiment. FIG. 8 shows the example image displayed on the display device 30, on which the area except for the road area has a reduced resolution which is lower than the resolution of the road area on the image. In this case, because the operator can need only to monitor the road area having a high resolution, this makes it possible to increase the efficiency of performing the visual remote monitoring control of moving bodies such as the vehicle 10 at a remote location.

Because no vehicle can be running on the area with reduced resolution and/or brightness, the possibility that the image location in the area becomes the vehicle image location (as the moving body image location) is very low. Accordingly, it is acceptable to delete, from the storage 103, information of the target location and the image location regarding the area in which no vehicle can be running. This deletion makes it possible to reduce the total amount of the information to be stored in the storage 103.

Fourth Exemplary Embodiment

A description will be given of the information processing device 100 according to a fourth exemplary embodiment of the present disclosure with reference to FIG. 9.

The following description will explain a difference between the fourth exemplary embodiment and the first to third exemplary embodiments. Further, the following description will explain the structure in which the display control part 105 instructs the display device 30 to display predicted image positions, through which the vehicle 10 will be passing, and finally reach the final destination on the image.

Autonomous vehicles or self-driving vehicles determine in advance a final destination to which a vehicle will reach, and a plurality of predicted transit positions through which the vehicle will be passing. The autonomous vehicle adjusts the behavior of the vehicle so as to pass through the predicted transit positions in order. This control allows the vehicle to correctly pass the predicted transit positions and to reach the final destination. That is, autonomous vehicles have in advance position information regarding predicted transit positions which the vehicle will be passing through, and to reach the final destination.

In the structure of the information processing device 100 according to the fourth exemplary embodiment, the identification part 104 specifies image positions corresponding to the predicted transit positions acquired by the vehicle information acquisition part 101 on the basis of the correspondence relationship between the target location and the image location stored in the storage 103. The specified image positions correspond to the respective predicted image positions on the image through which the vehicle 30 will be passing on the image displayed on the display device 30.

The display control part 105 instructs the display device 30 to display the image acquired by the image data acquisition part 102 and the predicted image positions together. It is further acceptable for the display control part 105 to connect the predicted image positions from each other so as to show predicted image paths of the vehicle 10 on the image.

Figure 9:
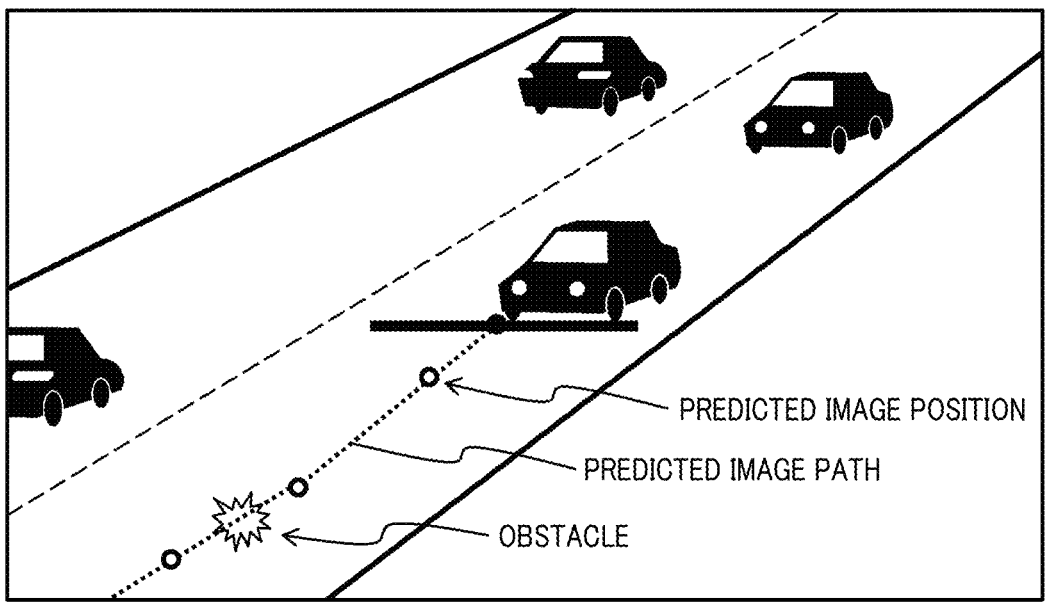
FIG. 9 is a view showing an example image displayed on the display device under the control of the information processing device according to a fourth exemplary embodiment of the present disclosure.

FIG. 9 is a view showing an example image displayed on the display device 30 under the control of the information processing device 100 according the fourth exemplary embodiment. As shown in FIG. 9, circle marks represent the predicted image positions on the image, and dotted lines represent predicted image paths which connect the predicted image positions, in addition to the location of the vehicle 10 on the image. It is possible for the operator to easily perform visual recognition of the predicted image paths on the image through which the vehicle 10 will drive.

Further, FIG. 9 shows an obstacle in front of the vehicle 10 on the traffic lane in the image.

When the vehicle 10 moves forward on the traffic lane, the vehicle 10 will collide with the obstacle. In order to avoid this, the operator can perform the drive assist for the vehicle 10 on the basis of the image shown in FIG. 9.

As previously described, the information processing device 100 according to the fourth exemplary embodiment allows the operator to monitor various types of moving bodies, for example, to monitor the vehicle 10 as a remote monitoring target while considering the predicted drive path on the image, and further allows the operator to perform the correct drive assist control of the vehicle 10.

Fifth Exemplary Embodiment

A description will be given of an information processing device 110 according to a fifth exemplary embodiment with reference to FIG. 10 and FIG. 11.

The information processing device 100 according to the first to fourth exemplary embodiments performs the remote monitoring control so as to assist the remote monitoring operation of the vehicle 10. The operator in a traffic operations center monitors the vehicle 10 as the remote monitoring target on the image displayed on the display device 30.

However, in a real case, the operator in the traffic operations center monitors simultaneously a plurality of images acquired by the plurality of cameras 20 as the image acquisition devices installed at a plurality of locations, and obtain a plurality of drive paths of a plurality of vehicles on the images.

The information processing device 110 according to the fifth exemplary embodiment provides a remote monitoring control of a specific vehicle on the basis of the images transmitted from the plurality of cameras 20 and information regarding driving locations of vehicles transmitted from the plurality of vehicles.

Figure 10:
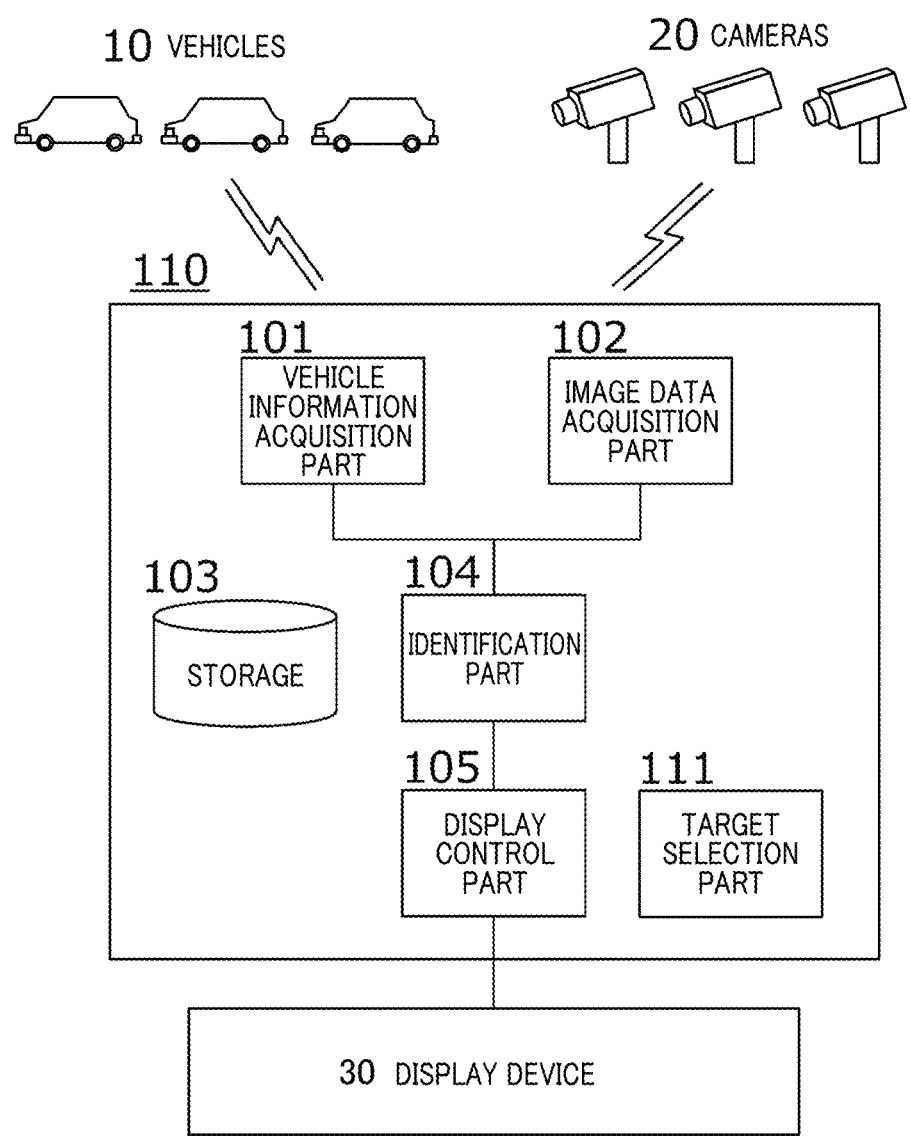
FIG. 10 is a block diagram showing the information processing device according to a fifth exemplary embodiment of the present disclosure.

FIG. 10 is a block diagram showing the information processing device 110 according to the fifth exemplary embodiment of the present disclosure. As shown in FIG. 10, the information processing device 110 according to the fifth exemplary embodiment has a target selection part 111 in addition to the components in the information processing device 110 according to the first to fourth exemplary embodiments.

Figure 11:
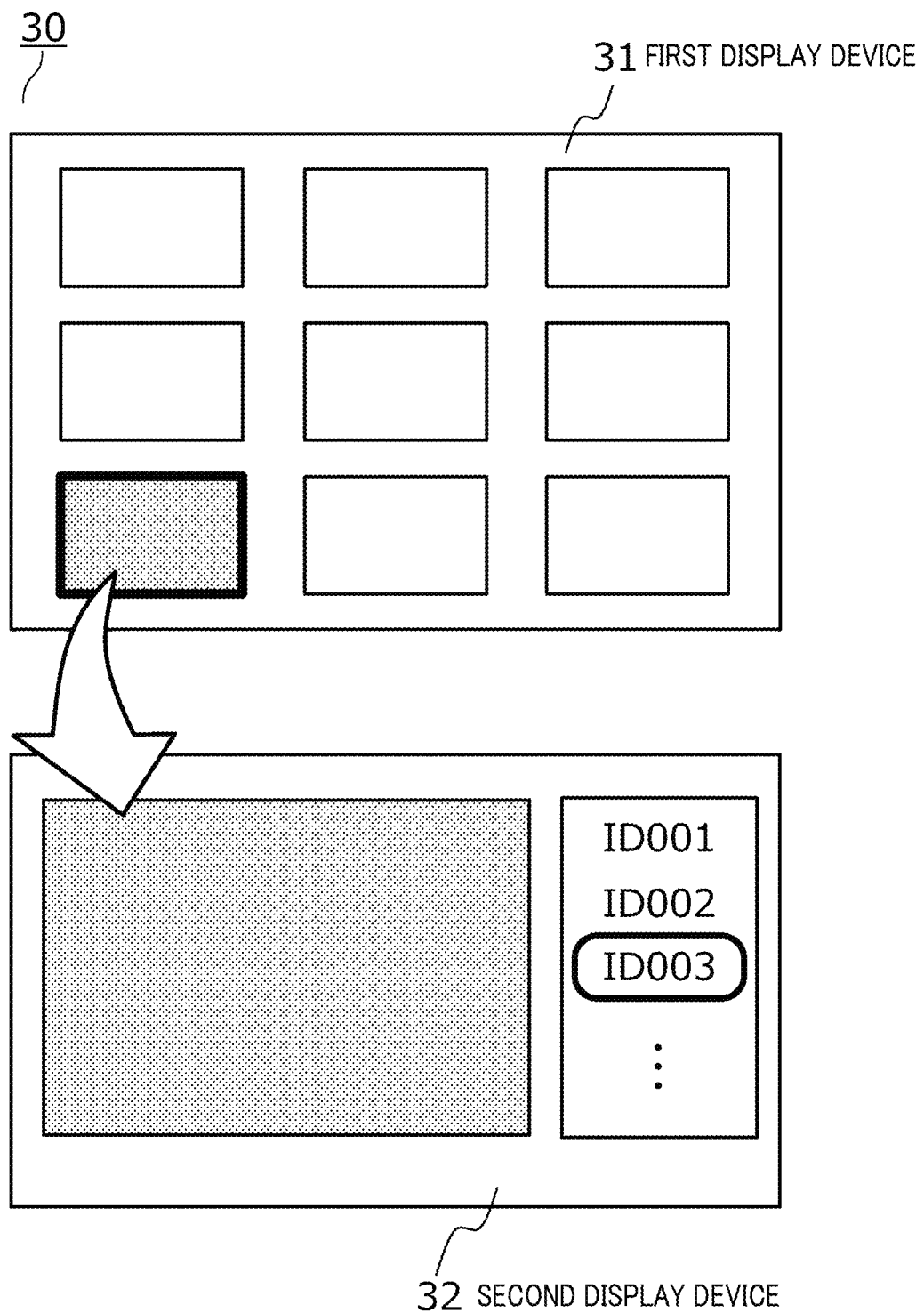
FIG. 11 is a view showing an image displayed on the display device under the control of the information processing device according to the fifth exemplary embodiment.

FIG. 11 is a view showing an image displayed on the display device 30 under the control of the information processing device 110 according to the fifth exemplary embodiment. As shown in FIG. 11, the display device 30 has a first display device 31 and a second display device 32.

The first display device 31 displays each of images acquired by and transmitted from the plurality of cameras 20. On the other hand, the second display device 32 displays an enlarged image of the image selected from the plurality of images displayed on the first display device 31. At the right-hand side in the second display device 32, the second display device 32 displays information regarding identification numbers or characters of the vehicles which are transmitting the driving location of the vehicles to the information processing device 110.

The target selection part 111 selects, as a remote monitoring target object, the vehicle 10 selected by the operator from the plurality of vehicles acquired by the vehicle information acquisition part 101.

For example, the target selection part 111 selects, as the monitoring target object, the vehicle having the specific identification number, selected by the operator through an input device (not shown) in the traffic operations center, from the vehicles displayed on the second display device 32. FIG. 11 shows the image in which the target selection part 111 selects the vehicle having the identification number ID003.

In the structure of the information processing device 110 according to the fifth exemplary embodiment, the target selection part 111 selects the vehicle as the monitoring target object which has been selected by the operator in the operator in the traffic operations center.

However, the concept of the present disclosure is not limited by this. For example, it is acceptable for the target selection part 111 to automatically select a specific vehicle when this specific vehicle or its on-vehicle system calls the operator in the traffic operations center.

The identification part 104 selects and specifies the image including, i.e. displaying the vehicle 10 selected by the target selection part 111 from the plurality of images displayed on the first display device 31. Specifically, the identification part 104 specifies the vehicle image location of the vehicle 10 on the image on the basis of the correspondence relationship between the target location and the image location which has been stored in the storage 103.

The identification part 104 specifies the image including the specified vehicle image location of the vehicle 10 from the plurality of images displayed on the first display device 31. It is preferable for the identification part 104 to instruct the display control part 105 to highlight the frame of the specified image.

The display control part 105 instructs the display device 30 so that the second display device 32 displays the image which is one of the plurality of images displayed on the first display device 31 and specified by the identification part 104.

When receiving information regarding the driving location (N30, E30, see FIG. 2B and FIG. 11) of the vehicle 10 transmitted from the vehicle 10 having the identification number ID003, the identification part 104 selects the image location which corresponds to the driving location (N30, E30) on the basis of the correspondence relationship between the target location and the image location which has been stored in the storage 103

The identification part 104 specifies the specific image including the image location (see the image designated by bold frames at the lower left side shown in FIG. 11) in the plurality of images displayed on the first display device 31. The display control part 105 instructs the second display device 32 to enlarge the image specified by the identification part 104, and to display the enlarged image.

As previously described, the information processing device 110 according to the fifth exemplary embodiment has the structure which makes it possible to specify and display the specific image including the monitoring target object when the display device displays a plurality of images acquired by and transmitted from a plurality of image acquisition devices.

Modifications

The concept of the present disclosure is not limited by the first to fifth exemplary embodiments previously described. For example, it is possible for the information processing device according to the present disclosure to have various modifications.

For example, it is acceptable for the identification part 104 to selects, from the plurality of images displayed on the first display device 31, an image having a high possibility in which the vehicle 10 will be shown in the near future, instead of selecting the image in which the vehicle 10 is shown. In this modification, the vehicle information acquisition part 101 acquires a predicted transit position to which the vehicle will move in the near future in addition to the driving location of the vehicle 10, similar to the function of the information processing device according to the fourth exemplary embodiment.

The identification part 104 specifies a predicted image location corresponding to the predicted transit position of the vehicle 10 on the basis of the correspondence relationship between the target location and the image location stored in the storage 103. The identification part 104 specifies the image including the predicted image location from the images displayed on the first display device 31.

When the vehicle information acquisition part 101 has received the moving speed of the vehicle 10, it is possible for the identification part 104 to calculate a time period until the vehicle will reach the predicted transit position on the basis of the received moving speed of the vehicle 10. In this case, the identification part 104 extracts the predicted transit position only through which the vehicle 10 will pass within a predetermined time period (for example, five minutes), and selects, i.e. specifies the image including the predicted transit position extracted by the identification part 104.

In this case, the identification part 104 specifies the predicted image position on the basis of the correspondence relationship between the target location and the image location stored in the storage 103, and specifies the image including the predicted image positions. However, it is acceptable for the identification part 104 to specify the image having a high possibility, in which the vehicle will be shown in the near future, on the basis of the driving location and direction of the vehicle 10.

Figure 12:
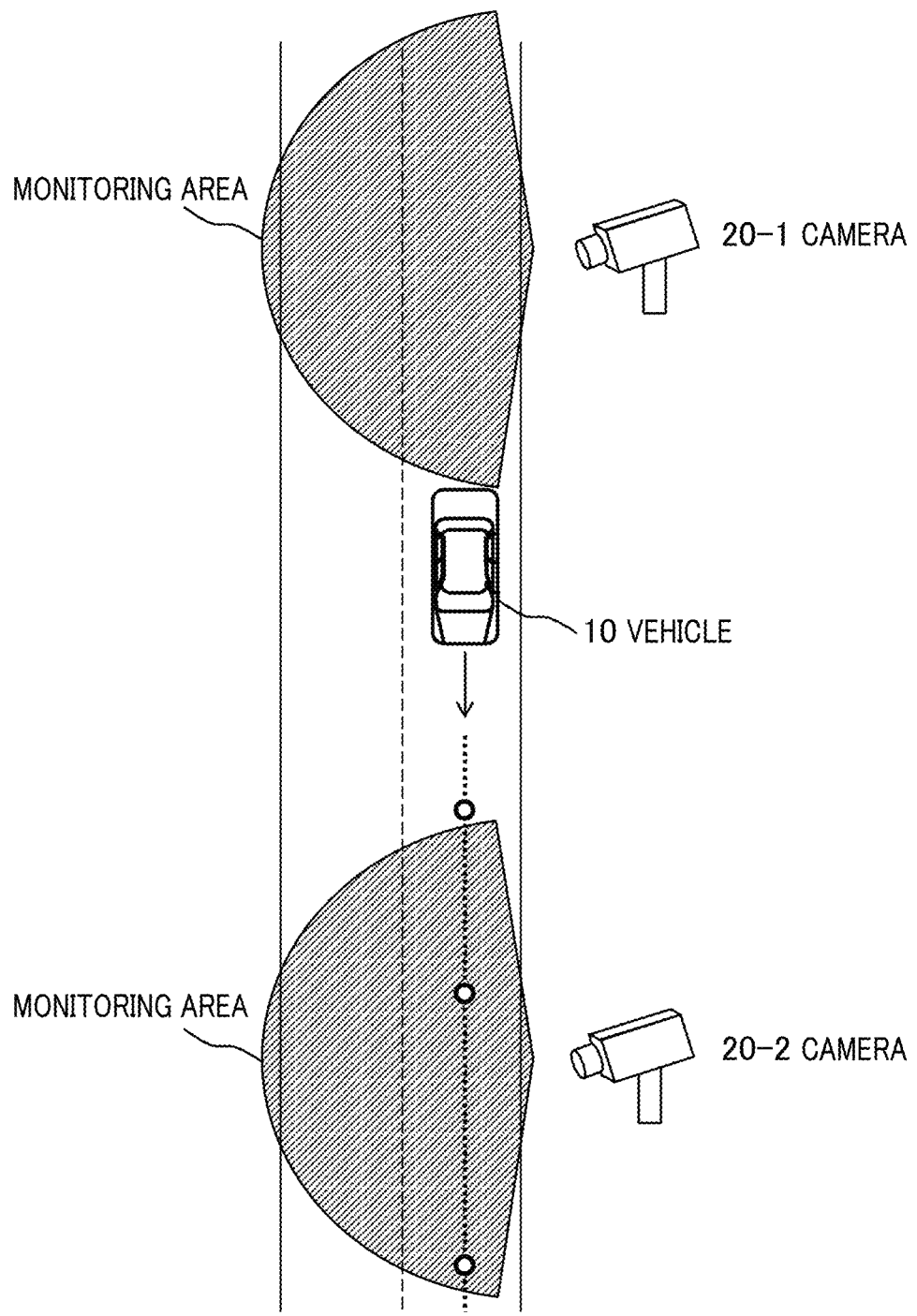
FIG. 12 is a view showing the vehicle running on a traffic lane and a plurality of cameras as the image acquisition devices installed along the traffic lane.

FIG. 12 is a view showing the vehicle 10 running on a traffic lane and cameras 20-1 and 20-2 as the image acquisition devices installed along the traffic lane. In the situation shown in FIG. 12, because the vehicle 10 is running on the traffic lane which is out of the monitoring areas of both the cameras 20-1 and 20-2, the images acquired by the cameras 20-1 and 20-2 do not include any vehicle 10.

For example, the identification part 104 specifies the camera 20-1 when the information processing device has a structure in which the identification part 104 specifies the camera closest to the driving location of the vehicle 10. However, because the vehicle 10 has passed through the monitoring area of the camera 20-1, it is difficult for the image acquired by the camera 20-1 will show the vehicle 10 in the near future. On the other hand, the structure of the modification makes it possible to specify the image which will show the vehicle 10 in the near future, and to instruct the second display device 32 to display the image corresponding to the predicted image position in the near future. This structure of the modification allows the operator to correctly monitor the vehicle 10 as the remote monitoring target object as soon as the vehicle enters the monitoring area of the camera 20-2.

Summary

The structure and behavior as the improved feature of the information processing device according to the present disclosure have been previously described in detail.

The block diagrams shown in FIG. 1 and FIG. 10 represent the functions as the structure of the information processing device according to the present disclosure. It is possible to realize those functions by using a combination of hardware and software programs. It is possible to use a method capable of realizing these functions of the present disclosure.

It is acceptable to rearrange a sequence of these functions and steps in the flowchart shown in FIG. 4 without limiting the scope of the present disclosure.

In order to realize these functions of the present disclosure previously described, it is possible to use software programs to be stored in a non-transitory computer readable storage medium. The software program can cause a central processing unit (CPU, or a processor) to execute these functions of the present disclosure. Such a computer system is composed of a CPU, a memory and a hard disk drive as a non-transitory computer readable storage medium.

It is possible to store software programs realizing these functions of the present disclosure into memory devices, for example, a non-transitory tangible storage medium, a dedicated or a general purpose hardware such as a hard disk drive, a universal serial bus memory (USB memory), a compact disk (CD), a blue-ray disk (BD), an internal memory device such as a RAM, ROM, etc. It is possible to receive these software programs stored in the memory devices through a communication network, and to store the received software programs into a dedicated memory. This allows easy upgrading of the software programs, and for the information processing unit to receive the latest upgraded software programs.

It is possible to apply the information processing device according to the present disclosure to various applications such as various monitoring centers for monitoring moving bodies in addition to motor vehicles. The information processing device according to the present disclosure performs a real-time remote monitoring control by the operator. However, the concept of the present disclosure is not limited by this. It is possible to apply the information processing device according to the present disclosure to an application for recognize a past movement of a moving body on the basis of past locations of the moving body and past images acquired by the cameras.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. An information processing device provided external to a moving body, the information processing device being communicable with the moving body and an image acquisition device, the image acquisition device being provided external to the moving body, the information processing device comprising a computer system, the computer system comprising a processor and a storage, the processor being configured to provide:
  a first acquisition part acquiring information regarding a first actual location of the moving body on a road based on the information processing device receiving data that is transmitted from the moving body;
  a second acquisition part acquiring an image acquired by the image acquisition device based on the information processing device receiving data that is transmitted from the image acquisition device;
  an identification part specifying a moving body image location as a location of the moving body on the image on the basis of the first actual location of the moving body and information regarding a correspondence relationship, the correspondence relationship comprising a relationship between an image location on the image and a second actual location on the road that corresponds to the image location on the image, the correspondence relationship being stored on the storage; and
  a display control part instructing a display device to display the image and information indicating the moving body image location together, the display device being located external to the moving body and configured to allow a remote operator to view the image and information indicating the moving body image location together, wherein:
  the first acquisition part further acquires a moving speed of the moving body and a first time when the moving body acquires the first actual location of the moving body;
  the second acquisition part further acquires a second time when the image acquisition device acquires the image;

the identification part specifies a moving body image location before correction which corresponds to the first actual location of the moving body on the basis of the correspondence relationship stored in the storage, the correction determining a location of the moving body on the image by correcting a timing difference between the first time and the second time;

the identification part calculates a movement distance of the moving body during a time period measured from the first time and the second time on the basis of the timing difference between the first time and the second time, and the moving speed of the moving body;

the identification part determines the moving body image location as the location of the moving body on the image based on the calculated movement distance of the moving body, the moving body moving along a moving direction of the moving body from the moving body image location before correction; and the display control part is configured to display to the display device information, which indicates a correction region on the image between the moving body image location before correction and a moving body image location after correction, wherein:

the processor is further configured to provide a target selection part selecting, as a remote monitoring target object, the moving body from a plurality of moving bodies;

the display device comprises a first display region which displays a plurality of images acquired from a plurality of image acquisition devices and a second display region which displays the image specified by the identification part of the plurality of the images displayed on the first display region; and in a case where the second acquisition part acquires the plurality of the images acquired by the image acquisition device and the display device displays the plurality of the acquired images on the first display region:
  based on the processor receiving a predetermined signal submitted from the moving body, the target selection part selects, as the remote monitoring target object, the moving body which submitted the signal;
  the identification part specifies the image captured from the remote monitoring target object from among the plurality of the images displayed on the first display region to be displayed on the second display region; and
  the display device displays the image from the remote monitoring target object on the second display region.

2. The information processing device according to claim 1, wherein
the display control part instructs the display device to display the information regarding the image location before correction in addition to the moving body image location as the location of the moving body on the image.

3. The information processing device according to claim 1, wherein
the image has a first area and a second area, the moving body moves on the first area, and the moving body does not move on the second area, and
the display control part instructs the display device to display the image in which the first area has a resolution which is higher than a resolution of the second area, or the first area has a brightness which is higher than a brightness of the second area.

4. The information processing device according to claim 1, wherein
the first acquisition part further acquires a predicted transit position through which the moving body will be passing, and
the identification part specifies a predicted image position on the image which corresponds to the predicted transit position on the basis of the correspondence relationship between the second actual location and the image location, and
the display control part further instructs the display device to display the image and information regarding the predicted image position on the image.

5. The information processing device according to claim 1, wherein
the first acquisition part further acquires a predicted transit position through which the moving body will be passing,
the second acquisition part comprising a plurality of image acquisition parts acquires a plurality of images,
the identification part specifies a predicted image position on the image which corresponds to the predicted transit position on the basis of the correspondence relationship between the second actual location and the image location, selects one image including the predicted image position from the plurality of images, and
the display control part instructs the display device to display the image specified by the identification part.

6. The information processing device according to claim 1, wherein
the display device displays the image and the information indicating the moving body image location together to the remote operator, who is remotely monitoring a plurality of moving bodies displayed on the display device, to correctly recognize the moving body as a target moving body on the basis of both the image and the information indicating the moving body image location being displayed together.

7. A computer implemented method to be performed by a processor in a computer system connected to a display device, the computer system including the processor comprising a storage, the processor provided external to a moving body, the processor being communicable with the moving body and an image acquisition device, the image acquisition device being provided external to the moving body, the computer implemented method comprising steps of:

acquiring information regarding a first actual location of the moving body on a road based on the processor receiving data that is transmitted from the moving body;

acquiring an image acquired by the image acquisition device based on the processor receiving data that is transmitted from the image acquisition device;

specifying a moving body image location as a location of the moving body on the image on the basis of the first actual location of the moving body and information regarding a correspondence relationship, the correspondence relationship comprising a relationship between an image location on the image and a second actual location on the road that corresponds to the image location on the image, the correspondence relationship being stored on the storage; and instructing the display device to display the image and information indicating the moving body image location together, the display device being located external to the moving body and configured to allow a remote operator to view the image and information indicating the moving body image location together, wherein:

a moving speed of the moving body and a first time when the moving body acquires the first actual location of the moving body are acquired;

a second time is acquired at a time the image acquisition device acquires the image;

a moving body image location is specified before correction which corresponds to the first actual location of the moving body on the basis of the correspondence relationship stored in the storage, the correction determining a location of the moving body on the image by correcting a timing difference between the first time and the second time;

a movement distance of the moving body is calculated during a time period measured from the first time and the second time on the basis of the timing difference between the first time and the second time, and the moving speed of the moving body;

the moving body image location is determined as the location of the moving body on the image based on the calculated movement distance of the moving body, the moving body moving along a moving direction of the moving body from the moving body image location before correction, and the display device is instructed to display information that indicates a correction region on the image between the moving body image location before correction and a moving body image location after correction, wherein:

the moving body is selected from a plurality of moving bodies as a remote monitoring target object;

the display device comprises a first display region which displays a plurality of images acquired from a plurality of image acquisition devices and a second display region which displays the specified image of the plurality of the images displayed on the first display region; and in a case where the plurality of the images is acquired and the display device displays the plurality of the acquired images on the first display region:

based on the processor receiving a predetermined signal submitted from the moving body, the moving body which submitted the signal is selected as the remote monitoring target object;

the image captured from the remote monitoring target object from among the plurality of the images displayed on the first display region is specified to be displayed on the second display region; and the display device displays the image from the remote monitoring target object on the second display region.

8. A non-transitory computer readable storage medium storing a computer implemented program for causing a central processing unit in a computer system to execute functions, the central processing unit provided external to a moving body, the central processing unit being communicable with the moving body and an image acquisition device, the image acquisition device being provided external to the moving body, the functions executed by the central processing unit in the computer system comprising:

acquiring information regarding a first actual location of the moving body on a road based on the central processing unit receiving data that is transmitted from the moving body;

acquiring an image acquired by the image acquisition device based on the central processing unit receiving data that is transmitted from the image acquisition device;

specifying a moving body image location as a location of the moving body on the image on the basis of the first actual location of the moving body and information regarding a correspondence relationship, the correspondence relationship comprising a relationship between an image location on the image and a second actual location on the road that corresponds to the image location on the image, the correspondence relationship being stored on a storage; and instructing a display device to display the image and information indicating the moving body image location together, the display device being located external to the moving body and configured to allow a remote operator to view the image and information indicating the moving body image location together, wherein:

a moving speed of the moving body and a first time when the moving body acquires the first actual location of the moving body are acquired;

a second time is acquired at a time the image acquisition device acquires the image;

a moving body image location is specified before correction which corresponds to the first actual location of the moving body on the basis of the correspondence relationship stored in the storage, the correction determining a location of the moving body on the image by correcting a timing difference between the first time and the second time;

a movement distance of the moving body is calculated during a time period measured from the first time and the second time on the basis of the timing difference between the first time and the second time, and the moving speed of the moving body;

the moving body image location is determined as the location of the moving body on the image based on the calculated movement distance of the moving body, the moving body moving along a moving direction of the moving body from the moving body image location before correction, and the display device is instructed to display information that indicates a correction region on the image between the moving body image location before correction and a moving body image location after correction, wherein:

the central processing unit is further configured to select, as a remote monitoring target object, the moving body from a plurality of moving bodies;

the display device comprises a first display region which displays a plurality of images acquired from a plurality of image acquisition devices and a second display region which displays the specified image of the plurality of the images displayed on the first display region; and in a case where the central processing unit acquires the plurality of the images acquired by the image acquisition device and the display device displays the plurality of the acquired images on the first display region:

based on the central processing unit receiving a predetermined signal submitted from the moving body, the central processing unit selects, as the remote monitoring target object, the moving body which submitted the signal;

the central processing unit specifies the image captured from the remote monitoring target object from among the plurality of the images displayed on the first display region to be displayed on the second display region; and the display device displays the image from the remote monitoring target object on the second display region.

9. An information processing device installed external to a moving body, the information processing device being communicable to the moving body and an image acquisition device, the image acquisition device being installed external to the moving body, the information processing device comprising a computer system, the computer system comprising a processor and a storage, the processor being configured to provide:

a first acquisition part acquiring information regarding a first actual location of the moving body on a road based on the information processing device receiving data that is transmitted from the moving body, the first actual location is a location of the moving body obtained from a global positioning system mounted on the moving body;

a second acquisition part acquiring an image acquired by the image acquisition device based on the information processing device receiving data that is transmitted from the image acquisition device;

an identification part specifying a moving body image location as a location of the moving body on the image on the basis of the first actual location of the moving body and information regarding a correspondence relationship, the correspondence relationship comprising a relationship between an image location on the image and a second actual location on the road that corresponds to the image location on the image, the correspondence relationship being stored on the storage; and a display control part instructing a display device to display the image and information indicating the moving body image location together, the display device being located external to the moving body and configured to allow a remote operator to view the image and information indicating the moving body image location together, wherein:

the first acquisition part further acquires a moving speed of the moving body and a first time when the moving body acquires the first actual location of the moving body;

the second acquisition part further acquires a second time when the image acquisition device acquires the image;

the identification part calculates a third actual location as an actual location of the moving body at the second time on the basis of a difference between the first time and the second time, the moving speed of the moving body, a moving direction of the moving body and the first actual location of the moving body, and the identification part specifies the moving body image location as the location of the moving body on the image which corresponds to the third actual location based on the second actual location and the correspondence relationship between the second actual location and the image location, wherein:

the processor is further configured to provide a target selection part selecting, as a remote monitoring target object, the moving body from a plurality of moving bodies;

the display device comprises a first display region which displays a plurality of images acquired from a plurality of image acquisition devices and a second display region which displays the image specified by the identification part of the plurality of the images displayed on the first display region; and in a case where the second acquisition part acquires the plurality of the images acquired by the image acquisition device and the display device displays the plurality of the acquired images on the first display region:

based on the processor receiving a predetermined signal submitted from the moving body, the target selection part selects, as the remote monitoring target object, the moving body which submitted the signal;

the identification part specifies the image captured from the remote monitoring target object from among the plurality of the images displayed on the first display region to be displayed on the second display region; and the display device displays the image from the remote monitoring target object on the second display region.

* * * * *